Figure 1:
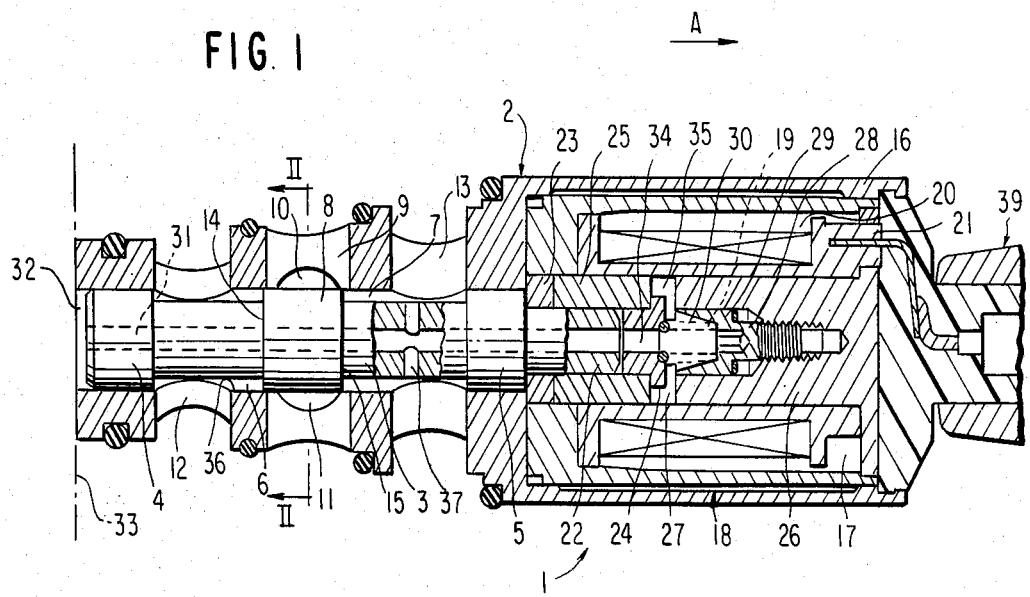

United States Patent [19]

Häfner et al.

[11] Patent Number: 4,655,254

[45] Date of Patent: Apr. 7, 1987

[54] CONTROL VALVE, IN PARTICULAR AN ELECTROHYDRAULIC CONTROL VALVE

[75] Inventors: Günther Häfner, Stuttgart; Karl-Ernst Noreikat, Esslingen; Hans-Dieter Schmidt, Wendlingen; Ulrich Letsche; Bernhard Bauer, both of Stuttgart, all of Fed. Rep. of Germany

[73] Assignee: Daimler-Benz Aktiengesellschaft, Fed. Rep. of Germany

[21] Appl. No.: 810,844

[22] Filed: Dec. 20, 1985

Related U.S. Application Data

[63] Continuation of Ser. No. 471,040, Mar. 1, 1983, abandoned.

[30] Foreign Application Priority Data

Mar. 2, 1982 [DE] Fed. Rep. of Germany ....... 3207393

[51] Int. Cl.[4] .............................................. F16K 21/00
[52] U.S. Cl. ............................... 137/625.65; 137/312; 251/129.15
[58] Field of Search ........................... 137/625.65, 312; 251/129; 123/450

[56] References Cited

U.S. PATENT DOCUMENTS

| 3,899,003 | 8/1975 | Tirelli | 137/625.65 |
| 4,133,348 | 1/1979 | Spitz | 137/625.65 |
| 4,133,511 | 1/1979 | Hartmann et al. | 137/625.65 |
| 4,250,922 | 2/1981 | Willi et al. | 137/625.65 |
| 4,310,143 | 1/1982 | Determan | 137/625.65 |
| 4,312,380 | 1/1982 | Leiber et al. | 137/626.65 |
| 4,316,599 | 2/1982 | Bouvet et al. | 137/625.65 |
| 4,375,226 | 3/1983 | Loup | 137/625.65 |
| 4,396,037 | 8/1983 | Wilcox | 137/625.65 |
| 4,428,346 | 1/1984 | Hoshi | 123/450 |

FOREIGN PATENT DOCUMENTS

| 2511991 | 10/1976 | Fed. Rep. of Germany | 137/625.65 |
| 2710644 | 9/1977 | Fed. Rep. of Germany | . |
| 9307 | 1/1982 | Japan | 137/625.65 |

Primary Examiner—Albert J. Makay
Assistant Examiner—Steven E. Warner
Attorney, Agent, or Firm—Barnes & Thornburg

[57] ABSTRACT

A control valve, in particular, an electrohydraulic control valve for controlling the injection pump of a diesel engine, incorporates a slider which is guided in a housing, in a manner permitting movement in the axial direction, the housing possessing radial flow-ports and, in the region of the inner peripheral surface, at least one annular space carrying a fluid. In order to ensure that the control-valve housing can be manufactured economically, the annular space is formed by a plurality of flow-ports which intersect in the region of the inner peripheral surface of the housing and pierce the housing radially.

1 Claim, 2 Drawing Figures

CONTROL VALVE, IN PARTICULAR AN ELECTROHYDRAULIC CONTROL VALVE

This is a continuation of application Ser. No. 471,040, filed Mar. 1, 1983, now abandoned.

The invention relates to a control valve for controlling a fuel injection pump for a diesel engine.

German Offenlegungsschrift No. 2,710,644 discloses an electrohydraulic control valve incorporating a slider which is guided in a housing, in a manner permitting movement in the axial direction. The housing possesses radial flow-ports which open into annular spaces, the latter being formed by machined-out recesses at the inner periphery of the housing. A comparatively large manufacturing effort is required in order to produce the flow-ports and the annular spaces.

The invention provides a control valve in which the housing can be manufactured economically with regard to the flow-ports and the annular spaces.

This is achieved, according to the invention, by means of a control valve, in particular an electrohydraulic control valve for controlling the injection pump of a diesel engine, this control valve possessing a slider which is guided in a housing, in a manner permitting movement in the axial direction, the housing possessing radial flow-ports and, in the region of the inner peripheral surface, at least one annular space carrying a fluid, characterized in that the annular space is formed by a plurality of flow-ports which intersect in the region of the inner peripheral surface of the housing and pierce the housing radially.

In the housing of the control valve according to the invention, the annular space is formed by the special arrangement and design of the flow-ports themselves, so that, in order to achieve economical manufacture, additional machined-out recesses are no longer necessary.

Accordingly, it is an object of the present invention to provide an improved control valve.

It is a further object of the invention to provide a control valve in which the housing can be manufactured economically with regard to flow-ports and annular spaces.

It is a further object of the invention to provide a control valve, in particular, an electrohydraulic valve for controlling the injection pump of a diesel engine, the control valve possessing a slider which is guided in a housing, in a manner permitting movement in the axial direction, the housing possessing radial flow-ports and, in the region of an inner peripheral surface, at least one annular space carrying a fluid, characterized in that the annular space is formed by a plurality of flow-ports which intersect in the region of the inner peripheral surface of the housing and pierce the housing radially.

It is a further object of the present invention to provide a control valve with a slider means disposed within a housing, the slider means having control edges which can communicate to pass or block fluid passage.

It is a further object of the invention to provide a control valve wherein fluid passage is controlled by width modulated electrical pulses applied to an electromagnetic actuating means therefor.

It is another object of the invention to provide a control valve having a leakage space disposed within the housing and a second leakage space adjacent the slider means and means for inducing fluid to flow between the two leakage spaces and to a return flow bore.

Figure 2:
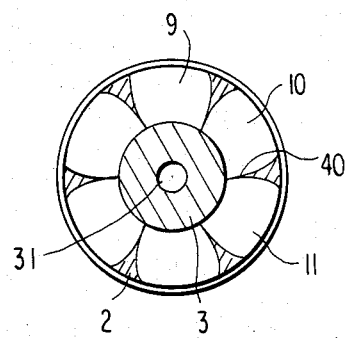

These and other objects, features and advantages of the present invention will become more apparent from the following description when taken in connection with the accompanying drawings which show, for the purposes of illustration only, one embodiment in accordance with the present invention, and wherein:

FIG. 1 shows a longitudinal section through the electrohydraulic three-way control valve; and FIG. 2 shows a section along the line II-II in FIG. 1.

In reference to the Figures, wherein like parts are indicated by like reference numerals, the control valve, marked 1, comprises a housing 2 and a slider 3 which is guided in this housing, in a manner permitting movement in the axial direction, and which is mounted in the housing 2 by means of guide-shoulders 4 and 5. Between the guide-shoulders 4 and 5 the slider 3 possesses annular spaces 6 and 7, together with a control-shoulder 8, the annular spaces being formed by machined-out clearances. In the region of the control-shoulder 8, control-bores 9, 10 and 11, formed by holes which have been drilled through radially, connect the control valve 1, via an annular space 40, FIG. 2, and a control line, to for example, a hydraulic motor, an inlet bore 12, formed by a hole which has been drilled through radially, in the region of the machined-out clearance 6, connects the control valve 1, via an annular space which is not marked more specifically, and an inlet line, to a hydraulic fluid reservoir, and a return-flow bore 13, formed by a hole which has been drilled through radially, in the region of the machined-out clearance 7, connects the control valve 1, via an annular space which is not marked more specifically, and return-flow lines, to the hydraulic fluid reservoir and, for example, to the hydraulic motor. Any desired number of control-bores can be chosen, corresponding to the through-flow requirements, these bores interacting with peripheral control-edges 14 and 15 of the control-shoulder 8. The annular space 40, FIG. 2 is formed by the control-bores 9, 10 and 11, which intersect in the region of the inner peripheral surface 36 of the housing 2. An electromagnetic shifting device 18 is installed in an end region 16 of the housing 2, in a recess 17, this device 18 enabling the slider 3 to be moved, in the axial direction, against the spring force of a compression spring 19. The shifting device 18 comprises an electromagnetic coil 20, which is potted inside a coil former 21 which is composed of a medium which repels both water and oil, and an armature 25 which is axially locked, on a step 22 located at one end of the slider 3, between a spacer-ring 23, bearing against the guide-shoulder 5, and a centering-bush 24 which, in common with the spacer-ring 23, is manufactured from non-magnetic material. The coil former 21 is mounted on a magnet core 26 which is made of soft iron and possesses a self-tapping socket-head screw 29 in an axially drilled blind hole 28 on the end-face of 26 facing the spacer-ring 23. In the region of the hexagonal socket, the screw 29 is provided with a machined-out recess 30, which is preferably conical in shape, the compression spring 19, which bears against the centering-bush 24, being supported in this recess. The slider 3 is provided with a leakage-line 31 which passes through it in the axial direction and connects a leakage-space 32, bounded, inter alia, by the housing mounting 33 indicated by a dash-dot line, to a leakage-space 35, via a leakage-line 34 passing axially through the centering-bush 24, and which is connected to the return-flow bore 13 via leakage-bores 37 which are formed by holes which have been drilled radially though the slider 3.

Current is supplied to the electromagnet coil 20 via an electrical connector 39 which is known per se.

When no electric current flows through the electromagnetic coil 20, the compression spring 19 holds the slider 3 in the position represented in FIG. 1, in which the control-edge 14 shuts-off the annular space 6 with respect to the control-bores 9, 10 and 11, and the control-edge 15 opens the annular space 7 with respect to the controlbores 9, 10 and 11, so that the inflow to the hydraulic motor, via the inlet bore 12, is closed, and the return flow from the hydraulic motor, to the hydraulic fluid reservoir, via the return-flow bore 13 and the control-bores 9, 10 and 11, is opened.

If pulse-width-modulated current is supplied to the electromagnetic coil 20, the slider 3 is moved, in the arrow-direction A, against the spring force of the compression spring 19, as a result of which pulse-width-modulated signals influence the position of the control-edges 14, 15, and hence influence the cross-sectional areas available for through-flow.

If the slider 3 is moved, in the arrow-direction A, by a distance such that the control-edges, 14 and 15, shut off the control-bores 9, 10 and 11, with respect to the inflow bore 12 and the return-flow bore 13 respectively, the slider 3 has reached its balanced position.

If the slider 3 is moved further in the arrow-direction A, beyond this balanced position, it reaches positions in which the control-edge 14 opens the annular space 6 with respect to the control-bores 9, 10 and 11, and the control-edges 15 shuts off the annular space 7 with respect to the control-bores 9, 10 and 11, so that the inflow to the hydraulic motor is opened via the inflow bore 12, and the return flow from the hydraulic motor, to the hydraulic fluid reservoir, via the return-flow bore 13 and the control-bores 9, 10 and 11, is closed.

As a result of the movement of the slider 3, in the arrow-direction A and, as the case may be, counter to this direction, and due also to the excitation of the coil 20 by the pulse-width-modulated signals, the latter causing vibration of the slider which has a beneficial effect on its control-behavior, the resulting displacement effect induces leakage-oil to flow from the leakage-space 32 into the leakage-space 35, and vice versa, and to be supplied, via the leakage-bore 37, to the return-flow bore 13, and also to the control-bores 9, 10 and 11, in accordance with the position of the slider.

It will be appreciated by those skilled in the art that the length of the time period during which the slider 3 is located in one of the several positions thereof, is controlled by the modulation of the pulse-width of the electromagnetic signal input to electromagnet coil 20 at connector 39.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A control valve for a diesel engine fuel injection pump comprising
   a housing having at least
      an inlet bore
      a return bore, and
      plural control bores,
   said inlet bore, return flow bore and control bores being disposed axially with respect to each other,
   a slider means having an axis for guided axial movement within the housing, the slider means having at least
   a first control edge means disposed axially adjacent the inlet bore and control bores for performing one of communicating or blocking fluid passage between the inlet bore and the control bores,
   a second control edge means disposed adjacent the return flow bore and the control bores for performing one of communicating or blocking fuel passage between the return flow bore and the control bores, and
   means for actuating said slider means for causing said first and second control edge means to perform said communicating or blocking operations,
   leakage line means disposed within said slider means, and
   means communicating said leakage line means with said return flow bore,
   means for inducing oil to flow between said leakage line means and said return flow bore,
   the control bores having axes lying substantially in a single plane at right angles to the axis of the slider means said axes of the control bores lying substantially radially with respect to the axis of the inlet and outlet bores and slider means, surfaces of the plural control bores intersecting at their inner extremities to form a chamber substantially cylindrically shaped and disposed about the slider means.

* * * * *